US009726145B2

(12) United States Patent
Shen et al.

(10) Patent No.: US 9,726,145 B2
(45) Date of Patent: Aug. 8, 2017

(54) SYSTEM AND METHOD FOR PROTECTION OF A WIND TURBINE BATTERY BACKUP PITCH CONTROL SYSTEM

(71) Applicant: General Electric Company, Schenectady, NY (US)

(72) Inventors: Longhui Shen, Shanghai (CN); David Ray Hudnall, Simpsonville, SC (US); Jianquan Wang, Shenzhen (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 421 days.

(21) Appl. No.: 14/470,968

(22) Filed: Aug. 28, 2014

(65) Prior Publication Data

US 2015/0184634 A1    Jul. 2, 2015

(30) Foreign Application Priority Data

Dec. 31, 2013  (CN) .......................... 2013 1 0747081

(51) Int. Cl.
*F03D 7/02*  (2006.01)
*F03D 80/80*  (2016.01)

(52) U.S. Cl.
CPC ......... *F03D 7/0224* (2013.01); *F03D 7/0268* (2013.01); *F03D 80/82* (2016.05); *F05B 2260/845* (2013.01); *Y02E 10/723* (2013.01)

(58) Field of Classification Search
CPC .............................. F03D 7/0224; H02J 7/0034
See application file for complete search history.

(56) References Cited

U.S. PATENT DOCUMENTS

| 1,467,256 A | 9/1923 | John |
| 1,815,418 A | 7/1931 | O'Bryan |
| 1,936,430 A | 11/1933 | Godron |
| 1,959,566 A | 5/1934 | Brubaker |
| 2,233,723 A | 3/1941 | Ballard |
| 2,328,912 A | 9/1943 | Kotzback |
| 2,566,603 A | 9/1951 | Kantzow |
| 2,591,176 A | 4/1952 | Mason |
| 2,610,098 A | 9/1952 | Reiners |

(Continued)

FOREIGN PATENT DOCUMENTS

| DE | 102008014859 A1 | 10/2009 |
| FR | 1304041 A | 9/1962 |

(Continued)

OTHER PUBLICATIONS

Dykes, "Pressure-Backed Piston Rings, Passage", Pressure-Backed Piston Rings, pp. 2-22, Dec. 1, 1951.

(Continued)

*Primary Examiner* — Scott Bauer
(74) *Attorney, Agent, or Firm* — Dority & Manning, P.A.

(57) ABSTRACT

A pitch control system for a wind turbine includes a backup battery bank assigned to each pitch drive motor, with each battery bank having a plurality of individual batteries connected in series. A battery charger is connected in parallel across each battery in the battery bank. A protective circuit is configured with each battery charger and includes a voltage comparator circuit that detects a reverse voltage applied to the battery charger above a threshold value to isolate the battery charger from the reverse voltage.

17 Claims, 5 Drawing Sheets

(56) References Cited

U.S. PATENT DOCUMENTS

| | | | |
|---|---|---|---|
| 3,364,675 A | 1/1968 | Dorer | |
| 3,554,564 A | 1/1971 | Lassanske | |
| 3,608,911 A | 9/1971 | Prasse et al. | |
| 3,806,137 A | 4/1974 | Prasse et al. | |
| 4,235,447 A | 11/1980 | Davison, Jr. | |
| 4,358,121 A | 11/1982 | Sand | |
| RE32,395 E | 4/1987 | Geffroy et al. | |
| 4,681,326 A | 7/1987 | Kubo | |
| 4,848,212 A | 7/1989 | Kawano et al. | |
| 5,083,536 A | 1/1992 | Ariga | |
| 5,133,563 A | 7/1992 | Casellato | |
| 5,224,870 A * | 7/1993 | Weaver | A61B 5/0404 429/97 |
| 5,392,692 A | 2/1995 | Rao et al. | |
| 5,430,938 A | 7/1995 | Rao et al. | |
| 5,474,307 A | 12/1995 | DeBiasse et al. | |
| 5,490,445 A | 2/1996 | Rao et al. | |
| 5,517,379 A | 5/1996 | Williams et al. | |
| 5,564,699 A | 10/1996 | Lawrence et al. | |
| 5,691,870 A * | 11/1997 | Gebara | G06F 1/28 307/87 |
| D399,586 S | 10/1998 | Ranieri et al. | |
| D407,473 S | 3/1999 | Wimbock | |
| D413,402 S | 8/1999 | Ranieri et al. | |
| 6,131,503 A | 10/2000 | Takashima | |
| 6,536,385 B1 | 3/2003 | Takashima | |
| 6,724,593 B1 * | 4/2004 | Smith | H02J 7/0034 361/84 |
| 7,068,011 B2 | 6/2006 | Yang | |
| D553,781 S | 10/2007 | Pickard et al. | |
| 7,312,653 B2 | 12/2007 | Chen et al. | |
| D602,188 S | 10/2009 | Fabbri et al. | |
| 7,642,748 B2 * | 1/2010 | Glosser, Jr. | H02J 7/0018 320/116 |
| D617,487 S | 6/2010 | Fowler, Jr. et al. | |
| 7,730,866 B2 | 6/2010 | Melchior | |
| 7,740,448 B2 | 6/2010 | Meyer et al. | |
| D677,818 S | 3/2013 | Steele et al. | |
| D677,820 S | 3/2013 | Mayfield, III et al. | |
| D678,586 S | 3/2013 | Mayfield, III | |
| D678,597 S | 3/2013 | Lehman et al. | |
| D696,449 S | 12/2013 | Boyer et al. | |
| D698,969 S | 2/2014 | Johns et al. | |
| 2002/0070708 A1 * | 6/2002 | Wu | H02J 7/0034 320/134 |
| 2002/0158609 A1 | 10/2002 | Lavington et al. | |
| 2008/0036418 A1 * | 2/2008 | Simoes | H02J 7/0034 320/103 |
| 2013/0294053 A1 | 11/2013 | Marquardt et al. | |

FOREIGN PATENT DOCUMENTS

| | | |
|---|---|---|
| GB | 1042090 A | 9/1966 |
| JP | 6124876 A | 2/1986 |
| NL | 39704 C | 7/1936 |
| WO | 9730277 A1 | 8/1997 |

OTHER PUBLICATIONS

A European Search Report and Opinion issued in connection with corresponding EP Application No. 15170678.5 on Aug. 7, 2015.
A European Search Report and Opinion issued in connection with corresponding EP Application No. 15170677.7 on Aug. 7, 2015.

* cited by examiner

SYSTEM AND METHOD FOR PROTECTION OF A WIND TURBINE BATTERY BACKUP PITCH CONTROL SYSTEM

FIELD OF THE INVENTION

The present invention relates generally to the field of pitch control systems for wind turbines, and more particularly to a system for protecting the battery backup of such pitch control systems from reverse polarity conditions.

BACKGROUND OF THE INVENTION

The pitch control system of a conventional wind turbine generally includes an emergency pitch control capability to protect the wind turbine from an overspeed condition in the event of loss of AC control power or initiation of an emergency shutdown. Upon detection of a dip or loss of AC power (e.g., from a loss of grid power), the system activates to pitch the blades to a position to slow or stop the hub. Known emergency pitch control systems utilize a backup battery bank of, for example, 4 to 8 batteries assigned to each blade pitch drive for this purpose.

U.S. Pat. No. 7,740,448 describes a battery backup pitch control system wherein energy stored in a DC link capacitor is first used to operate the pitch control system in the event of a loss or dip in AC input power. A charged backup battery maintains charge on the DC link as voltage drops during operation of the emergency system. A diode is used in the circuit to prevent uncontrolled charging of the backup battery when DC link voltage is higher than battery voltage. A fuse prevents damage to the battery in the event of a short circuit on the DC link.

U.S. Pat. No. 7,642,748 describes a system for charging a string of backup batteries connected in series in the emergency pitch control system of a wind turbine. A battery charger is coupled in parallel to each respective battery for independent and charge profiles customized to specific battery requirements.

For systems wherein multiple chargers are assigned to respective batteries within a ban, such as the system in the U.S. Pat. No. 7,642,748 discussed above, certain battery failure modes may result in damage to the chargers. One such mode is a reverse polarity condition that occurs when the battery fails in an open circuit or high impedance failure mode and an emergency pitch operation is performed. In this instance, the voltage applied on the bad battery and its respective charger will be reversed, with this reversed polarity voltage being the sum of the remaining batteries in the bank. The other mode occurs when a battery in the bank opens transiently when the bank is connected to the pitch drive motor. The energy stored in the motor windings will cause a large transient current that will damage the charger.

The present invention provides a system to protect the battery chargers from the failure modes discussed above.

BRIEF DESCRIPTION OF THE INVENTION

Aspects and advantages of the invention will be set forth in part in the following description, or may be obvious from the description, or may be learned through practice of the invention.

In accordance with aspects of the invention, a pitch control system is provided for a wind turbine, wherein the wind turbine has one or more rotor blades coupled to a hub and a pitch drive motor assigned to each of the rotor blades. The system includes a backup battery bank assigned to each pitch drive motor, with each battery bank having a plurality of individual batteries connected in series. A battery charger is connected in parallel across each battery in the battery bank. Certain battery failure modes can result in damage to the charger. As discussed above, one such mode is a reverse polarity condition that occurs when the battery fails in an open circuit or high impedance state causing a reverse polarity voltage condition at the charger. The other mode occurs when the battery opens transiently when the bank is connected to the pitch drive motor causing a large transient current that will damage the charger. To protect the charger, a protective circuit is configured with each battery charger. The protective circuit includes a voltage comparator circuit that detects a reverse voltage applied to the battery charger above a threshold value to initiate isolation of the battery charger from the battery (and thus, the reverse voltage).

In a particular embodiment, the protective circuit includes a switch device that is activated to isolate the battery charger upon detection of the reverse voltage above the threshold value. A controller in the battery charger may configured to control the threshold value and switching hysteresis of the switch device.

To protect against the transient current surges, the protective circuit may further include a surge suppressor connected in parallel between the battery charger and the battery to suppress line voltage spikes from a transient open battery state during operation of the backup pitch control system. The surge suppressor may be, for example, a varistor, such as a metal-oxide varistor (MOV).

In certain embodiments, the pitch control system may include a central controller and a communication link between the central controller and each of the battery chargers, wherein the chargers report activation of the protective circuit to the central controller. These reports may trigger an alarm or alert indicating the battery failure and calling for corrective/maintenance action. The central controller may be the wind turbine controller, which in turn may communicate the condition to a site controller or remote monitoring station. In another embodiment, the chargers may communicate directly with the remote site controller or off-site monitoring station via the communication link.

The present invention also encompasses various methodologies for controlling a backup pitch control system of a wind turbine in accordance with aspects discussed above. In a particular embodiment, the method calls for configuring a plurality of backup batteries in series for each pitch drive in the pitch control system, as well as configuring a charging circuit with each of the individual batteries. In the event of loss of line power to the pitch control system or an emergency shutdown of the wind turbine, the batteries are connected to their respective pitch drive. At each charging circuit, the method includes monitoring for a reverse voltage condition from a failure of the associated battery. Upon detection of a reverse voltage above a threshold value, the charging circuit is disconnected from the reverse voltage, for example, by disconnecting the charging circuit from the battery.

The method may include monitoring for the reverse voltage with any manner of suitable voltage comparator circuit. The invention is not limited to a particular voltage comparator, and any number of known voltage comparators may be configured for this purpose. The method may include adjusting the threshold voltage of the comparator circuit with a controller associated with the charging circuit.

In a particular embodiment, the method includes disconnecting the charging circuit from the battery with a switching device that is activated upon detection of the reverse voltage at the threshold value. The switching hysteresis of the switching device may be controlled/adjusted by a controller associated with the charging circuit.

The method may further include protecting the charging circuit from transient line voltage surges with a surge suppressor, such as a MOV or MOV/capacitor combination, connected in parallel between the battery and the charging circuit.

The method may also include communicating detection of the reverse voltage above the threshold value from the charging circuits to a central wind turbine controller, or a central site controller common to a plurality of wind turbines, or to an off-site monitoring station.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
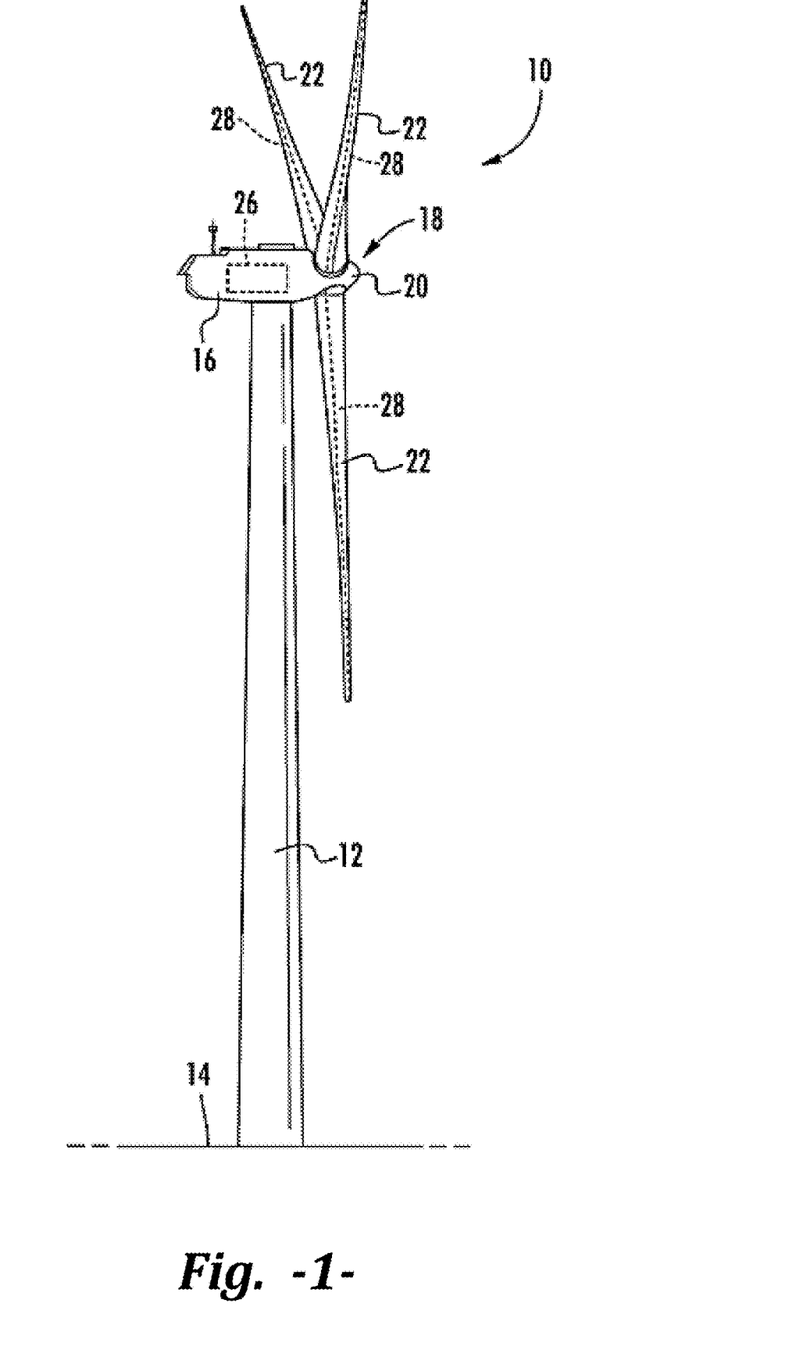
FIG. 1 is a perspective view of a conventional wind turbine.

Referring now to the drawings, FIG. 1 illustrates a perspective view of one embodiment of a conventional wind turbine 10 that may implement aspects of the system and methodology of the present invention. The wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. Each rotor blade 22 is spaced about the hub 20 to facilitate rotating the rotor 18 to enable kinetic energy to be transferred from the wind into usable mechanical energy, and subsequently, electrical energy. For instance, the hub 20 is rotatably coupled to an electric generator 24 (FIG. 2) positioned within the nacelle 16 for producing electrical energy.

The wind turbine 10 may also include a wind turbine controller 26 centralized within the nacelle 16, or located within any other component of the wind turbine 10, or at a location outside the wind turbine. Further, the controller 26 may be communicatively coupled to any number of the components of the wind turbine 10 in order to operate such components and/or to implement the pitch control function as described herein.

Figure 2:
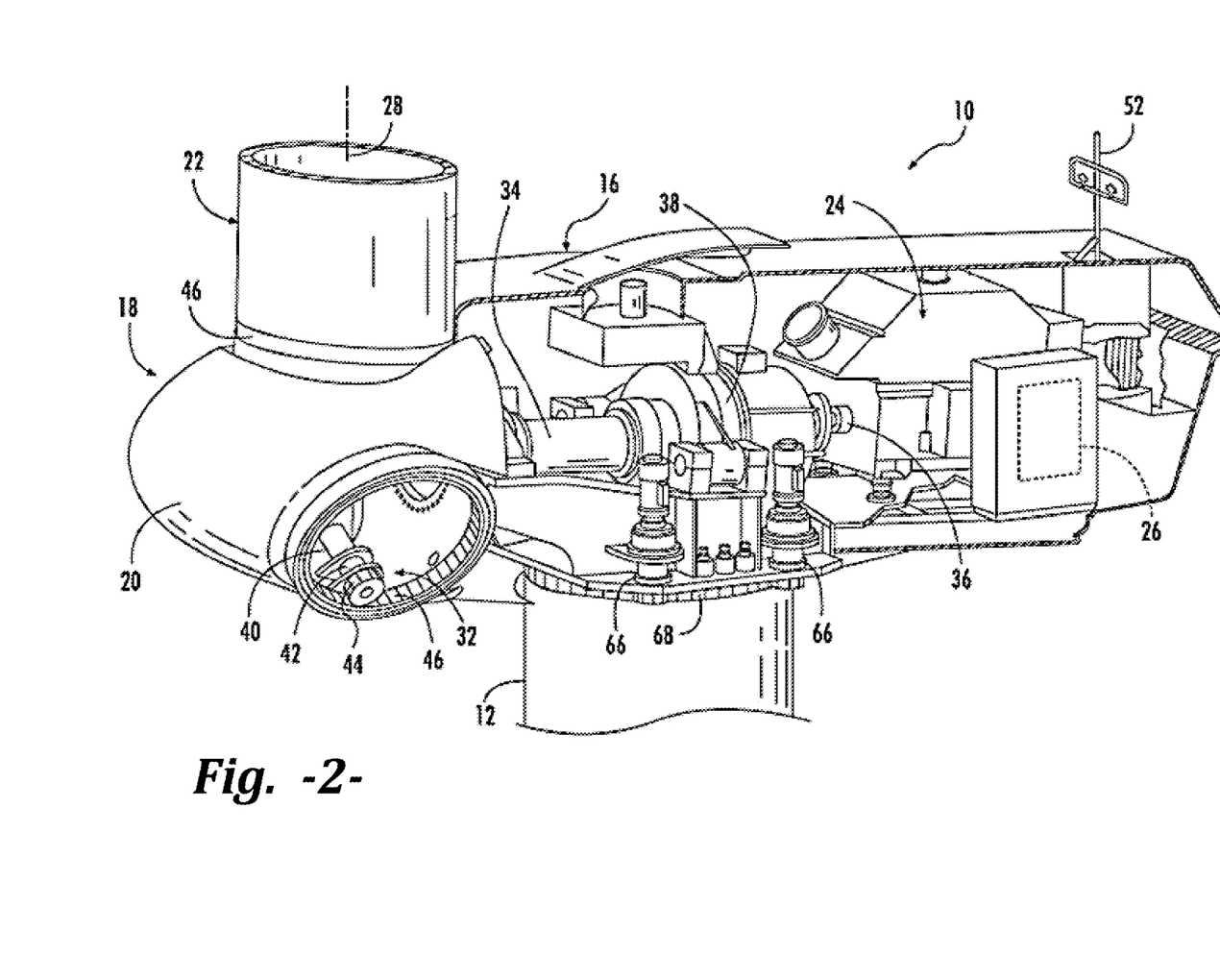
FIG. 2 is an internal component view of a nacelle of a conventional wind turbine.

Referring to FIG. 2, an internal view of a conventional nacelle 16 is illustrated. As shown, the generator 24 is coupled to the rotor 18 for producing electrical power from the rotational energy generated by the rotor 18. The rotor 18 may include a rotor shaft 34 coupled to the hub 20 for rotation therewith. The rotor shaft 34, in turn, is rotatably coupled to a generator shaft 36 of the generator 24 through a gearbox 38. As is generally understood, the rotor shaft 34 provides a low speed, high torque input to the gearbox 38 in response to rotation of the rotor blades 22 and the hub 20. The gearbox 38 is configured to convert the low speed, high torque input to a high speed, low torque output to drive the generator shaft 36 and, thus, the generator 24. The wind turbine 10 may also include a converter (not shown) configured to connect the generator 24 to the grid and to ensure a constant energy supply. More specifically, the converter is configured to convert a predetermined torque demand into rotational power to drive the generator 24.

The wind turbine 10 may include one or more yaw drive mechanisms 66 communicatively coupled to the controller 26, with each yaw drive mechanism(s) 66 configured to change the angle of the nacelle 16 relative to the wind (e.g., by engaging a yaw bearing 68 of the wind turbine 10).

The wind turbine 10 includes a pitch control system wherein each rotor blade 22 has a pitch adjustment mechanism 32 configured to rotate each rotor blade 22 about its pitch axis 28 (FIG. 1). Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28.

Under normal operating conditions, the pitch control system is controlled by the controller 26 to pitch the blades 22 as a function of various control and power generating parameters. The power for the pitch control system, and the drive motors 40 in particular, is supplied from the downstream grid. Upon a loss of grid power, or an emergency shutdown command from the controller 26, a battery backup system supplies power to the respective drive motors 40, as discussed in greater detail below.

Figure 3:
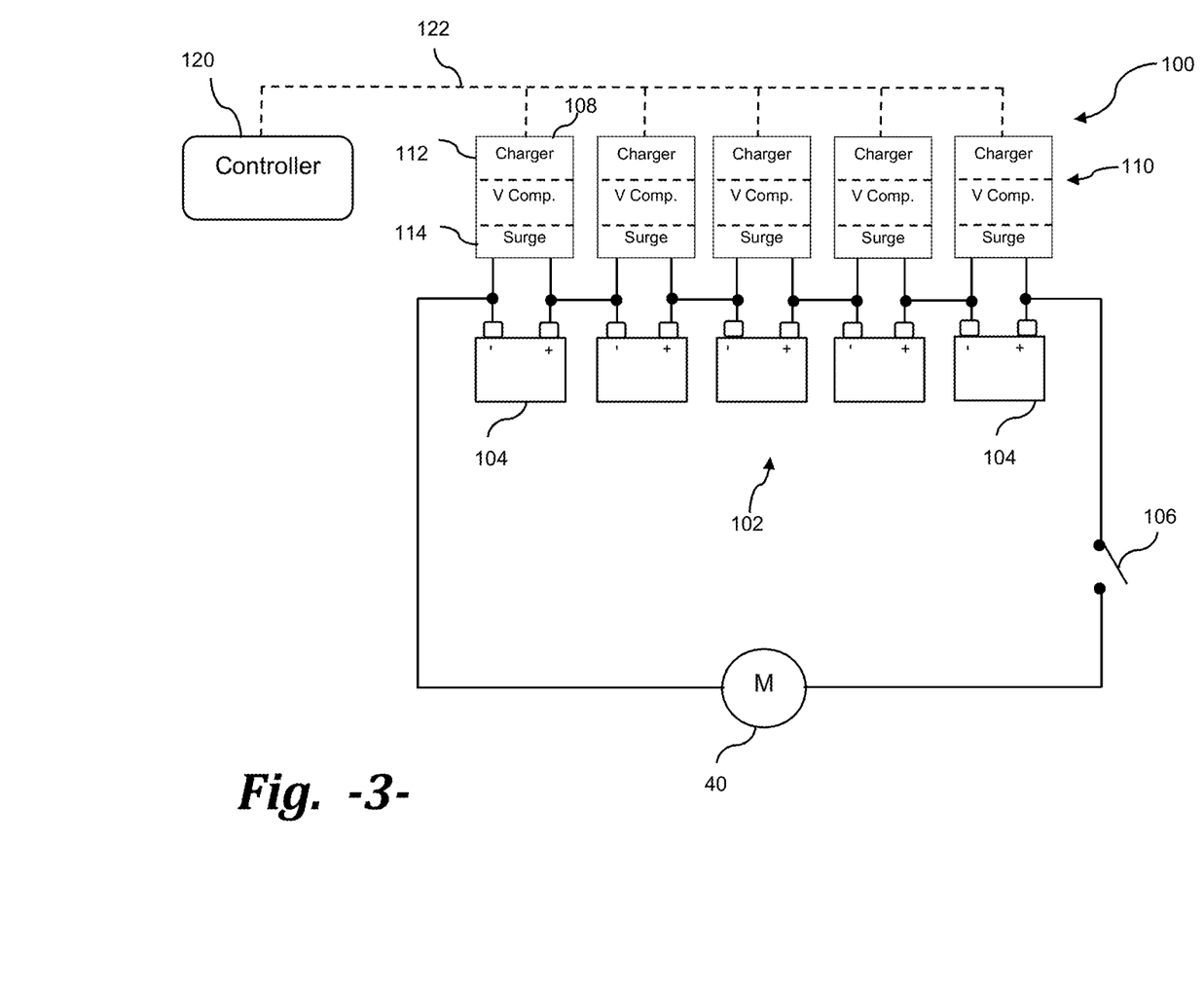
FIG. 3 is a diagram view of an embodiment of a pitch control battery backup system in accordance with aspects of the invention.

FIG. 3 is a simplified diagram of a pitch control system 100 that incorporates certain of the protective functions for the battery backup system in accordance with aspects of the invention. The system 100 includes a battery bank 102 assigned to each pitch drive motor 40 (FIG. 2). The respective battery banks 102 include a plurality of individual batteries 104 connected in series to provide a power output that is approximately equal to the combined output of the individual batteries 104. In the example illustrated in FIG. 3, five batteries 104 are connected in series in the battery bank 102. In the event of a loss of system power and/or to initiate an emergency shutdown, switching relay 106 is closed to complete the circuit between the battery bank 102 and the respective drive motor 40 to provide continuous drive power to enable variable blade pitch control of the blades 22, as is well-known in the art.

Figure 4:
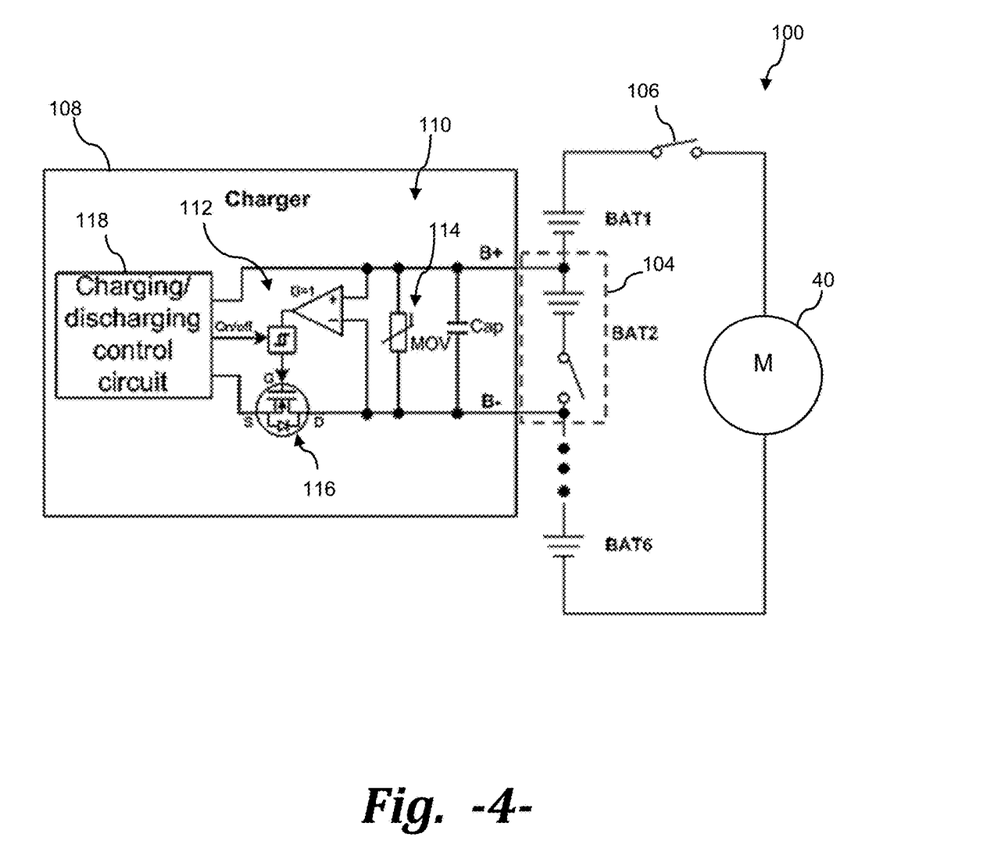
FIG. 4 is a diagram view of an embodiment of a protection circuit in accordance with aspects of the invention.
Figure 5:
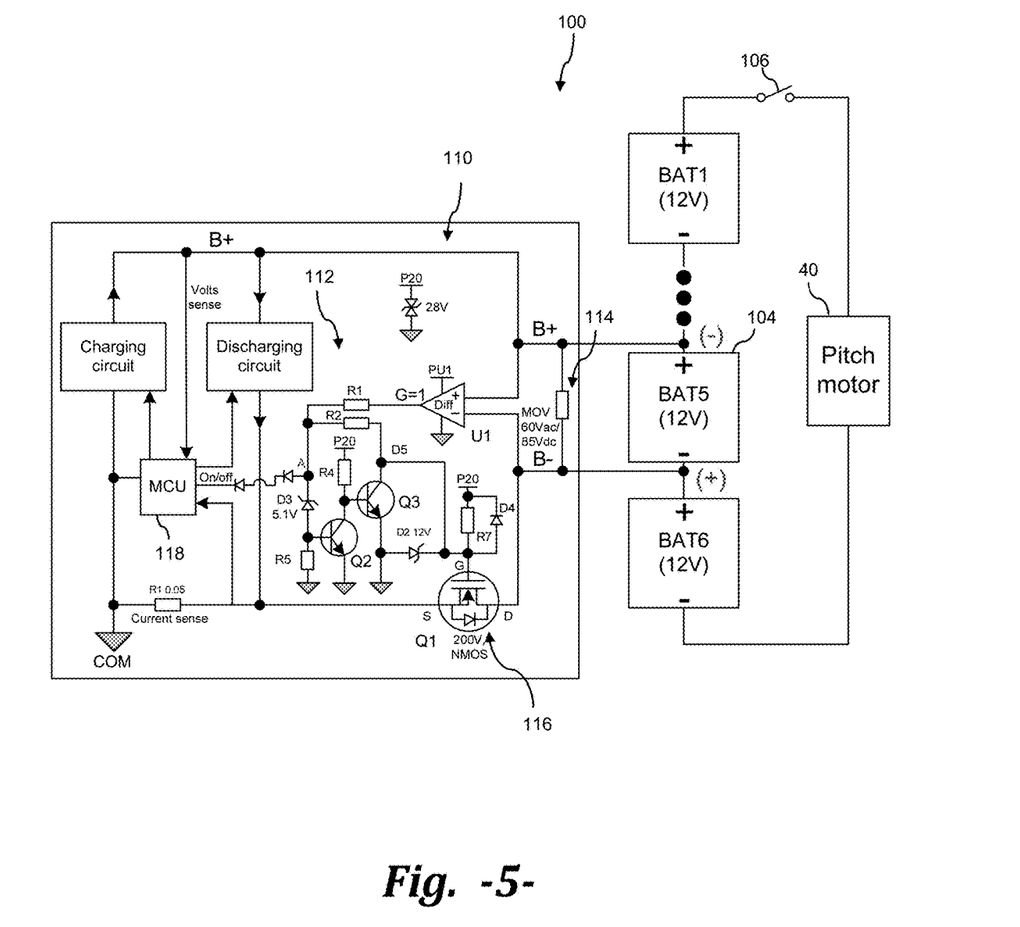
FIG. 5 is a more detailed diagram view of another embodiment of a protection circuit.

Still referring to FIG. 3, a battery charger circuit 108 is connected in parallel across each battery 104 in the battery bank 102. The battery charger circuit 118 serves to maintain the respective battery 104 in a charged state (with line power available), and to control the charging and discharge functions of the battery 104. It should be appreciated that battery charging circuits 108 are well known, and the system 100 is not limited to any particular charging circuit 108. An exemplary battery charging circuit 108 is described, for example, in U.S. Pat. No. 7,642,748 issued on Jan. 5, 2010, and assigned to General Electric Company. Referring to FIGS. 4 and 5, the battery charging circuit 108 typically includes a controller 118 to control the operating functions thereof.

Referring to FIG. 3, to protect the charging circuit 108 from the fault conditions discussed above (e.g., the reverse polarity and the transient voltage spike conditions), a protective circuit 110 is configured with each battery charger 108. The protective circuit 110 includes a voltage comparator circuit, components of which are generally denoted by reference 112 in FIG. 4. The voltage comparator circuit detects a reverse voltage applied to the battery charger 108 above a threshold value, whereupon action is initiated to isolate the battery charger 108 from the reverse polarity voltage.

Referring to FIG. 4, in general, the voltage comparator circuit 112 senses reversed terminal voltage across the battery terminals resulting from an open or high impedance fault at the battery, and compares the detected reversed voltage to a threshold voltage. If the threshold voltage is exceeded, action is taken to isolate the charger. The threshold voltage may be set by the charger controller 118 at a value that does not result in damage to the charger 108. The embodiment of a voltage comparator circuit 112 set forth in FIGS. 4 and 5 are for illustrative purposes. It should be appreciated that any number of conventional voltage comparator circuits and techniques are known that may be implemented with the present system 100, and that the invention is not limited to any particular type or configuration of voltage comparator.

Referring to FIGS. 4 and 5, in the illustrated embodiment, the protective circuit 110 includes a switch device 116 that is activated by the comparator circuit 112 to isolate the battery charger 108 upon detection of the reverse voltage above the threshold value. As depicted in FIG. 4, the charger controller 118 may also be configured to control the switching hysteresis of the switch device 116.

Referring to FIG. 4, to protect against the transient current surges and voltage spikes resulting from a transient open state of the battery 104 during operation of the backup pitch control system, the protective circuit 110 may further include a surge suppressor 114 connected in parallel between the battery charger 108 and the battery. Various types of surge suppressors are known and may be used in this regard. In a particular embodiment, the surge suppressor 114 may be a varistor, such as a metal-oxide varistor (MOV), alone or in combination with a parallel capacitor, as depicted in FIG. 4. A transient open state of the battery 104 will result in a certain amount of leakage inductance current from the pitch motor 40 windings, which may be around 20% of the total motor inductance. The MOV and capacitor combination is designed to absorb or dissipate the energy stored in the leakage inductance. In essence, the MOV is used to "freewheel" the inductance current.

The protective circuit 110 may be configured integrally with the charger 108, as depicted in FIGS. 4 and 5. In an alternate embodiment depicted for example in FIG. 3, the components of the protective circuit 110 may be separate from and connected in parallel with the charger 108.

FIG. 5 presents a more detailed diagram of an embodiment of the protective circuit 110 with the battery 104 in an open fault state, thereby generating a reversed polarity voltage at the battery terminals. In FIG. 5, U1 is an op-amp and D3 is a zener diode used to set the voltage threshold. Once voltage from U1 is higher than the zener voltage, current flows through the diode and turns on transistor Q2. With no current flow through D3, Q2 is off. Thus, D3, Q2, and Q3 form a comparator function in the embodiment of FIG. 5. This configuration may be desired for PCB constraints. It should be appreciated, however, that a standard comparator may be used for the same function.

Under normal operating conditions, when the voltage from battery 104 is, for example, 12V, the output of U1 is 12V. Such output voltage from U1 creates a current flow through R1, D3, and the base of transistor Q2 causing transistor Q2 to turn on, as discussed above. In an exemplary configuration, the voltage at point A is around 5.8V. Once Q2 turns on, Q3 turns off. The gate of Q1 is charged from power source P20 through resistor R7, and is clamped by Zener D2 to, for example, 12V. An additional small current flows through resistor R2 to accelerate Q2 turning on. Turning on of Q2 then turns on Q1.

Under fault conditions, that is in instances where the battery 104 fails in an open condition, comparator 112 will see a reverse voltage and will then produce a low output voltage, exemplarily zero volts output, or in any event, a voltage low enough such that current flow through R1, D3, and the base of transistor Q2 causing transistor Q2 to turn off. Upon transistor Q2 turning off, transistor Q3 is turned on by way of current flow from power supply P20 and current though resistor R4 into the base of transistor Q3. The turning on of transistor Q3 shunts voltage away from the gate of transistor Q1 and causes transistor Q1 to stop conducting, that is, to turn off. With transistor Q1 off, charger 108 is disconnected from battery 104 so that charger 104 is protected from the reverse voltage generated by the remaining serially connected batteries. Under such condition, MOV 114 operates to protect the comparator circuit as MOV 114 remains coupled in parallel across the battery connections to the protective circuit 110.

In certain embodiments, as depicted in FIG. 3, the pitch control system 100 may include a central controller 120 and a communication link 122 between the central controller 120 and each of the battery chargers 108. With this configuration, the chargers 108 can report activation of the protective circuit 110 to the central controller 120. These reports may trigger an alarm or alert indicating the battery failure and calling for corrective/maintenance action. The central controller 120 may be the wind turbine controller 26 (FIG. 2), which in turn may communicate the condition to a site controller or off-site remote monitoring station. In another embodiment, the central controller 120 may be the site controller or an off-site monitoring station, wherein the chargers 108 communicate directly with such controller 120.

The present invention also encompasses various methodologies for controlling a backup pitch control system of a wind turbine in accordance with aspects discussed above. In a particular embodiment, the method calls for configuring a plurality of backup batteries in series for each pitch drive in the pitch control system, as well as configuring a charging circuit with each of the individual batteries. In the event of loss of line power to the pitch control system or an emergency shutdown of the wind turbine, the batteries are connected to their respective pitch drive. At each charging circuit, the method includes monitoring for a reverse voltage condition from a failure of the associated battery. Upon detection of a reverse voltage above a threshold value, the charging circuit is isolated from the reverse voltage, for example, by disconnecting the charging circuit from the battery.

The method may include monitoring for the reverse voltage with any manner of suitable voltage comparator circuit. The invention is not limited to a particular voltage comparator, and any number of known voltage comparators may be configured for this purpose. The method may include adjusting the threshold voltage of the comparator circuit with a controller associated with the charging circuit.

In a particular embodiment, the method includes disconnecting the charging circuit from the battery with a switching device that is activated upon detection of the reverse voltage at the threshold value. The switching hysteresis of the switching device may be controlled/adjusted by a controller associated with the charging circuit.

The method may further include protecting the charging circuit from transient line voltage surges with a surge suppressor, such as a MOV or MOV/capacitor configuration, connected in parallel between the battery and the charging circuit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A pitch control system for a wind turbine, wherein the wind turbine has one or more rotor blades coupled to a hub and a pitch drive motor assigned to each of the rotor blades, the system comprising:
   a backup battery bank assigned to each pitch drive motor, each battery bank having a plurality of individual batteries connected in series;
   a battery charger connected in parallel across each battery in the battery bank;
   a protective circuit configured with each battery charger, the protective circuit comprising a voltage comparator circuit that detects a reverse voltage applied to the battery charger above a threshold value to isolate the battery charger from the reverse voltage, the protective circuit further comprising a surge suppressor connected in parallel between the battery charger and battery to suppress line voltage spikes from a transient open battery state during operation of the pitch control system,
   wherein the sue suppressor comprises a varistor connected in parallel to a capacitor.

2. The pitch control system of claim 1, wherein the protective circuit further comprises a switch device that is activated to isolate the battery charger upon detection of the reverse voltage above the threshold value.

3. The pitch control system of claim 2, further comprising a battery charger controller configured to control the threshold value and switching hysteresis of the switch device.

4. The pitch control system of claim 1, wherein the varistor comprises a MOV (metal-oxide varistor).

5. The pitch control system of claim 1, further comprising a central controller and a communication link between the central controller and each of the battery chargers, wherein activation of the protective circuits is reported to the central controller via the communication link.

6. The pitch control system of claim 5, wherein the central controller is a wind turbine controller.

7. The pitch control system of claim 5, wherein the central controller is a site controller common to a plurality of wind turbines.

8. The system as in claim 2, wherein, when the switching device is activated to isolate the battery charger from the battery, the surge suppressor protects the voltage comparator circuit from leakage inductance from the pitch drive motor.

9. A method for controlling a backup pitch control system of a wind turbine, comprising:
   for each pitch drive in the pitch control system, configuring a plurality of batteries in series;
   configuring a charging circuit with each of the individual batteries;
   in the event of loss of line power or an emergency shutdown of the wind turbine, connecting the batteries to the pitch drive;
   at each charging circuit, monitoring for a reverse voltage condition from a failure of the associated battery;
   upon detection of a reverse voltage above a threshold value, disconnecting the charging circuit from the battery;
   protecting the charging circuit from transient line voltage surges with a surge suppressor connected in parallel between the battery and the charging circuit,
   wherein the surge suppressor comprises a varistor connected in parallel to a capacitor.

10. The method as in claim 9, comprising monitoring for the reverse voltage with a voltage comparator circuit.

11. The method as in claim 10, comprising adjusting the threshold voltage with a controller associated with the charging circuit.

12. The method as in claim 9, comprising disconnecting the charging circuit from the battery with a switching device that is activated upon detection of the reverse voltage at the threshold value.

13. The method as in claim 12, comprising adjusting a switching hysteresis of the switching device with a controller associated with the charging circuit.

14. The method as in claim 9, further comprising communicating detection of the reverse voltage above the threshold value from the charging circuits to a central wind turbine controller.

15. The method as in claim 9, further comprising communicating detection of the reverse voltage above the threshold value from the charging circuits to a central site controller common to a plurality of wind turbines.

16. The method as in claim 9, wherein the varistor comprises a MOV (metal-oxide varistor).

17. The method as in claim 12, wherein, when the switching device is activated to disconnect the charging circuit from the battery, the surge suppressor protects a voltage comparator circuit of the charging circuit from leakage inductance from the pitch drive, the voltage comparator circuit configured to detect the reverse voltage condition.

* * * * *